US012307887B2

(12) United States Patent
Nagai et al.

(10) Patent No.: US 12,307,887 B2
(45) Date of Patent: May 20, 2025

(54) INTERSECTION CONTROL SYSTEM, INTERSECTION CONTROL METHOD, AND PROGRAM

(71) Applicant: TOYOTA JIDOSHA KABUSHIKI KAISHA, Toyota Aichi-ken (JP)

(72) Inventors: Manabu Nagai, Nagoya Aichi-ken (JP); Suguru Watanabe, Nagoya Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 18/219,183

(22) Filed: Jul. 7, 2023

(65) Prior Publication Data

US 2024/0021078 A1 Jan. 18, 2024

(30) Foreign Application Priority Data

Jul. 14, 2022 (JP) ................................ 2022-113105

(51) Int. Cl.
*G08G 1/00* (2006.01)
*G08G 1/01* (2006.01)
*G08G 1/081* (2006.01)

(52) U.S. Cl.
CPC ........... *G08G 1/081* (2013.01); *G08G 1/0145* (2013.01)

(58) Field of Classification Search
CPC ........ G08G 1/081; G08G 1/0145; G08G 1/07; G08G 1/09
See application file for complete search history.

(56) References Cited

U.S. PATENT DOCUMENTS 5,487,172 A * 1/1996 Hyatt ...................... G06F 13/16 700/8
2022/0292958 A1 9/2022 Nagai et al.

FOREIGN PATENT DOCUMENTS

| | | | |
|---|---|---|---|
| JP | H04-302400 | A | 10/1992 |
| JP | H07-093690 | A | 4/1995 |
| JP | 2004-348370 | A | 12/2004 |
| JP | 2006-268530 | A | 10/2006 |
| JP | 2011-159152 | A | 8/2011 |
| JP | 4930032 | B2 | 5/2012 |
| JP | 4935988 | B2 | 5/2012 |
| JP | 5255791 | B2 | 8/2013 |
| JP | 2018-077709 | A | 5/2018 |
| JP | 2022-138782 | A | 9/2022 |

* cited by examiner

*Primary Examiner* — Ian Jen
(74) *Attorney, Agent, or Firm* — Dinsmore & Shohl LLP

(57) ABSTRACT

An intersection control apparatus controls entries of vehicles into an intersection. The intersection control apparatus includes an intersection environment information acquisition unit configured to acquire a plurality of types of intersection environment information, an information conversion unit configured to encode the intersection environment information into a predetermined bit length for each type of the intersection environment information, an intersection control information generation unit configured to generate at least one intersection control information piece by integrating the plurality of types of intersection environment information through bit operations, and an intersection control unit configured to control the entries of the vehicles into the intersection using the at least one intersection control information piece.

7 Claims, 19 Drawing Sheets

| | 1->2 | 1->3 | 1->4 | 2->3 | 2->4 | 2->1 | 3->4 | 3->1 | 3->2 | 4->1 | 4->2 | 4->3 |
|---|---|---|---|---|---|---|---|---|---|---|---|---|
| 1->2 | 0 | 0 | 0 | 0 | 0 | 0 | 0 | 0 | 1 | 0 | 1 | 0 |
| 1->3 | 0 | 0 | 0 | 1 | 1 | 1 | 0 | 0 | 1 | 0 | 1 | 1 |
| 1->4 | 0 | 0 | 0 | 0 | 1 | 1 | 1 | 1 | 0 | 0 | 1 | 1 |
| 2->3 | 0 | 1 | 0 | 0 | 0 | 0 | 0 | 0 | 0 | 0 | 0 | 1 |
| 2->4 | 0 | 1 | 1 | 0 | 0 | 0 | 1 | 1 | 1 | 0 | 0 | 1 |
| 2->1 | 0 | 1 | 1 | 0 | 0 | 0 | 0 | 1 | 1 | 1 | 1 | 0 |
| 3->4 | 0 | 0 | 1 | 0 | 1 | 0 | 0 | 0 | 0 | 0 | 0 | 0 |
| 3->1 | 0 | 0 | 1 | 0 | 1 | 1 | 0 | 0 | 0 | 1 | 1 | 1 |
| 3->2 | 1 | 1 | 0 | 0 | 1 | 1 | 0 | 0 | 0 | 0 | 1 | 1 |
| 4->1 | 0 | 0 | 0 | 0 | 0 | 1 | 0 | 1 | 0 | 0 | 0 | 0 |
| 4->2 | 1 | 1 | 1 | 0 | 0 | 1 | 0 | 1 | 1 | 0 | 0 | 0 |
| 4->3 | 0 | 1 | 1 | 1 | 1 | 0 | 0 | 1 | 1 | 0 | 0 | 0 |

Fig. 4

| No. | BASIC INTERSECTION CONTROL INFORMATION |
|---|---|
| 1 | 000 000 100 111 |
| 2 | 111 000 000 100 |
| 3 | 100 111 000 000 |
| 4 | 000 100 111 000 |
| 5 | 100 000 100 101 |
| 6 | 101 100 000 100 |
| 7 | 100 101 100 000 |
| 8 | 000 100 101 100 |
| 9 | 100 110 000 100 |
| 10 | 100 100 110 000 |
| 11 | 000 100 100 110 |
| 12 | 110 000 100 100 |
| 13 | 000 110 000 110 |
| 14 | 110 000 110 000 |
| 15 | 001 100 001 100 |
| 16 | 100 001 100 001 |
| 17 | 100 100 100 100 |

Fig. 5

| INDEX | 1 | 2 | 3 | 4 | 5 | 6 | 7 | 8 | 9 | 10 | 11 | 12 |
|---|---|---|---|---|---|---|---|---|---|---|---|---|
| TRACK | TURN LEFT FROM NORTH | GO STRAIGHT FROM NORTH | TURN RIGHT FROM NORTH | TURN LEFT FROM EAST | GO STRAIGHT FROM EAST | TURN RIGHT FROM EAST | TURN LEFT FROM SOUTH | GO STRAIGHT FROM SOUTH | TURN RIGHT FROM SOUTH | TURN LEFT FROM WEST | GO STRAIGHT FROM WEST | TURN RIGHT FROM WEST |
| | 1->2 | 1->3 | 1->4 | 2->3 | 2->4 | 2->1 | 3->4 | 3->1 | 3->2 | 4->1 | 4->2 | 4->3 |

Fig. 6

| No. | ENTRY ROAD CONGESTION RESOLUTION CONTROL INFORMATION |
|---|---|
| 1 | 111 000 000 100 |
| 2 | 100 111 000 000 |
| 3 | 000 100 111 000 |
| 4 | 000 000 100 111 |

Fig. 13

| No. | EXIT ROAD CONGESTION RESOLUTION INFORMATION |
|---|---|
| 1 | 000 001 010 100 |
| 2 | 100 000 001 010 |
| 3 | 010 100 000 001 |
| 4 | 001 010 100 000 |

Fig. 14

INTERSECTION CONTROL SYSTEM, INTERSECTION CONTROL METHOD, AND PROGRAM

CROSS REFERENCE TO RELATED APPLICATIONS

This application is based upon and claims the benefit of priority from Japanese patent application No. 2022-113105, filed on Jul. 14, 2022, the disclosure of which is incorporated herein in its entirety by reference.

BACKGROUND

The present disclosure relates to an intersection control system, an intersection control method, and a program.

Japanese Unexamined Patent Application Publication No. 2011-159152 discloses a traffic signal control system that controls a plurality of traffic signal lights installed at an intersection. Specifically, a plurality of vehicle detectors are installed on each of a plurality of roads connected to an intersection, and a control pattern suitable for the control of the plurality of traffic signal lights is selected based on sensing signals output from the plurality of vehicle detectors.

SUMMARY

Incidentally, when entries of vehicles into an intersection is controlled, integrating a plurality of types of information in a short time is necessary for optimal control. However, it has been difficult to integrate a plurality of types of information in a short time, and thus it has not been possible to control them in response to the situation that changes from time to time.

An object of the present disclosure is to provide a technique that can respond quickly to the situation that changes from time to time when entries of vehicles into an intersection is controlled.

According to a first aspect of the present disclosure, an intersection control system for controlling entries of vehicles into an intersection includes: an intersection environment information acquisition unit configured to acquire a plurality of types of intersection environment information; an information conversion unit configured to encode the intersection environment information into a predetermined bit length for each type of the intersection environment information; an intersection control information generation unit configured to generate at least one intersection control information piece by integrating the plurality of types of intersection environment information through bit operations; and an intersection control unit configured to control the entries of the vehicles into the intersection using the at least one intersection control information piece. According to the above configuration, it is possible to respond quickly to the situation that changes from time to time when entries of vehicles into an intersection is controlled.

The plurality of types of intersection environment information may include at least two of: intersection entry information indicating a track of the vehicle attempting to enter the intersection when the vehicle passes through the intersection; pedestrian crossing information indicating a pedestrian crossing road that a pedestrian intends to cross among a plurality of roads connected to the intersection; local intersection control information currently being used for the control at the intersection; adjacent intersection control information currently being used for control at an intersection adjacent to the intersection; and congestion information indicating a congested road among the plurality of roads connected to the intersection. According to the above configuration, the intersection control information can be generated based on various environments around the intersection.

The at least one intersection control information may include a plurality of intersection control information pieces, and the intersection control unit may be configured to select one of the plurality of intersection control information pieces with a highest throughput among the plurality of intersection control information pieces, and control the entries of the vehicles into the intersection using the selected intersection control information piece. According to the above configuration, the number of vehicles that can be processed per unit time at the intersection can be effectively ensured.

The predetermined bit length may be set according to the number of combinations of an entry road to the intersection and an exit road from the intersection. According to the above configuration, the predetermined bit length is reasonably defined.

The intersection control unit may be configured to transmit the at least one intersection control information piece to the vehicle attempting to enter the intersection. According to the above configuration, a signal light can be omitted.

According to a second aspect, an intersection control method for controlling entries of vehicles into an intersection includes: acquiring a plurality of types of intersection environment information; encoding the intersection environment information into a predetermined bit length for each type of the intersection environment information; generating at least one intersection control information piece by integrating the plurality of types of intersection environment information through bit operations; and controlling the entries of the vehicles into the intersection using the at least one intersection control information piece. According to the above method, it is possible to respond quickly to the situation that changes from time to time when entries of vehicles into an intersection is controlled.

A program for causing a computer to execute the above intersection control method is provided.

According to the present disclosure, it is possible to respond quickly to the situation that changes from time to time when entries of vehicles into an intersection is controlled.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 4 shows track interference information;

FIG. 5 shows basic intersection control information;

FIG. 6 is a diagram for explaining tracks corresponding to respective bits of a bit array;

FIG. 9 shows visualization of the basic intersection control information of

FIG. 13 shows entry road congestion resolution control information;

FIG. 14 shows exit road congestion resolution information;

DESCRIPTION OF EMBODIMENTS

Figure 1:
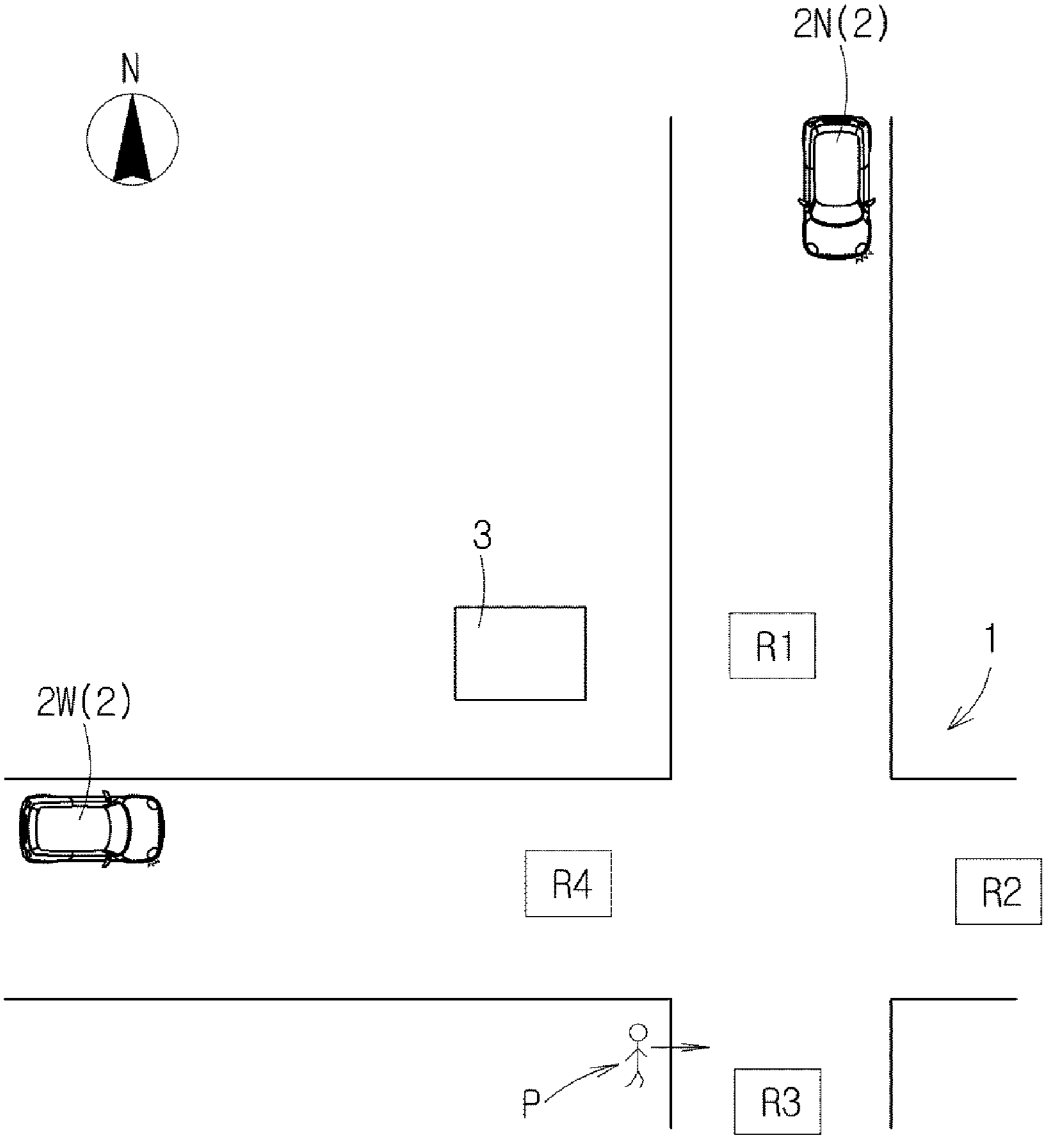
FIG. 1 is a plan view showing a plurality of vehicles approaching an intersection.

An embodiment of the present disclosure is described below with reference to the drawings. FIG. 1 shows a plurality of vehicles 2 traveling toward an intersection 1. That is, in FIG. 1, the plurality of vehicles 2 are approaching the intersection 1 in the vicinity of the intersection 1. In other words, the plurality of vehicles 2 are scheduled to pass through the intersection 1. The intersection 1 shown in FIG. 1 is a four-way junction. A road that is connected to the intersection 1 and extended north from the intersection 1 is referred to as a road R1. A road that is connected to the intersection 1 and extended east from the intersection 1 is referred to as a road R2. A road that is connected to the intersection 1 and extended south from the intersection 1 is referred to as a road R3. A road that is connected to the intersection 1 and extended west from the intersection 1 is referred to as a road R4. The intersection 1 may be a three-way, five-way, or six-way junction.

Hereinafter, for convenience of explanation, the vehicle 2 traveling south on the road R1 and approaching the intersection 1 is also referred to as a vehicle 2N. Similarly, the vehicle 2 traveling east on the road R4 and approaching the intersection 1 is also referred to as a vehicle 2W. For convenience of explanation, the vehicle 2N shall make a left turn at the intersection 1 and the vehicle 2W shall make a right turn at the intersection 1. Each of the plurality of vehicles 2 travels under automatic driving control. Alternatively, each of the plurality of vehicles 2 may be driven by an occupant. As shown in FIG. 1, an intersection control apparatus 3 is provided in the vicinity of the intersection 1. The intersection control apparatus 3 is a specific example of an intersection control system. The intersection control apparatus 3 may be implemented by a single apparatus or by distributed processing using a plurality of apparatuses. The intersection control apparatus 3 and the plurality of vehicles 2 are configured to be capable of two-way communication by, for example, wireless communication technology such as Wi-Fi (registered trademark) and Bluetooth (registered trademark) or via the Internet. A pedestrian attempting to cross the road R3 in the vicinity of the intersection 1 is referred to as a pedestrian P.

Figure 2:
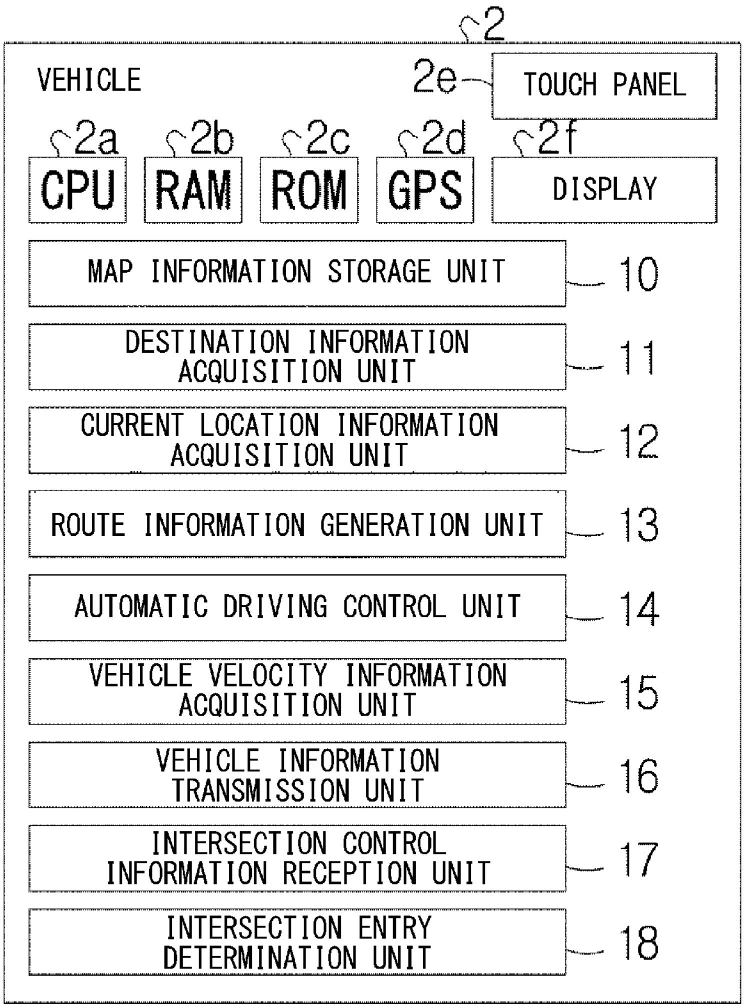
FIG. 2 is a functional block diagram of a vehicle.

FIG. 2 shows a functional block diagram of the vehicle 2. As shown in FIG. 2, the vehicle 2 includes a CPU 2*a* (Central Processing Unit), a RAM 2*b*(Random Access Memory) that can be freely read and written, and a ROM 2*c* (Read Only Memory). The vehicle 2 further include a GPS module 2d (Global Positioning System), a touch panel 2*e*, and a display 2*f*. The touch panel 2*e* and the display 2*f* are typically stacked on each other and integrated. The CPU 2*a* reads and executes a control program stored in the ROM 2*c*, and the control program causes hardware such as the CPU 2*a* to function as various functional units.

The various functional units include a map information storage unit 10, a destination information acquisition unit 11, a current location information acquisition unit 12, a route information generation unit 13, an automatic driving control unit 14, a vehicle velocity information acquisition unit 15, a vehicle information transmission unit 16, an intersection control information reception unit 17, and an intersection entry determination unit 18.

The map information storage unit 10 stores map information. The map information typically includes node information representing feature points of roads and link information for connecting the two nodes to express shapes of the roads. The feature points of the roads include intersections.

The destination information acquisition unit 11 acquires destination information input through the touch panel 2*e*.

The current location information acquisition unit 12 acquires current location information about the vehicles 2 using the GPS module 2d. The GPS module 2d is a specific example of a GNSS module (Global Navigation Satellite System). Specific examples of the GNSS modules include a GLONASS module (Global Navigation Satellite System), a Galileo module, a BeiDou module, and a QZSS module (Quasi-Zenith Satellite System). The current location information acquisition unit 12 may estimate and acquire the current location information about the vehicle 2 based on signal intensity of a signal received from a radio base station or a beacon emitted from the radio base station.

The route information generation unit 13 refers to the map information stored in the map information storage unit 10 and generates route information from the current location to the destination based on the destination information acquired by the destination information acquisition unit 11 and the current location information acquired by the current location information acquisition unit 12. The route information includes a plurality of track information pieces.

The plurality of track information pieces correspond one-to-one to a plurality of the intersections through which the vehicles 2 pass.

Each piece of track information indicates a track of the vehicle 2 when the vehicle 2 passes through the corresponding intersection. Each piece of track information typically includes pre-passage direction identification information indicating a direction in which the vehicle 2 travels right before passing through the intersection and post-passage direction identification information indicating a direction in which the vehicle 2 travels right after passing through the intersection. For example, since the vehicle 2N shown in FIG. 1 makes a left turn at the intersection 1, the pre-passage direction identification information in the track information corresponding to the intersection 1 is "south" and the post-passage direction identification information corresponding to the intersection 1 is "east".

Alternatively, each piece of the track information may include pre-passage road identification information indicating a road on which the vehicles 2 travel right before passing through the intersection 1 and post-passage road identification information indicating a road on which the vehicles 2 travel right after passing through the intersection 1. For example, since the vehicle 2N in FIG. 1 makes a left turn at the intersection 1, if a road ID of the road R1 extending northward from the intersection 1 is "No. 1234" and a road ID of the road R2 extending eastward from the intersection 1 is "No. 2345", the post-passage road identification information in the track information corresponding to the intersection 1 will be "1234" and the post-passage road identification information corresponding to the intersection 1 will be "2345".

The automatic driving control unit 14 controls the vehicles 2 to travel according to the route information generated by the route information generation unit 13.

The vehicle velocity information acquisition unit 15 acquires vehicle velocity information about the vehicles 2 based on detection signals from a vehicle velocity sensor which detects vehicle velocities of the vehicles 2.

The vehicle information transmission unit 16 transmits the vehicle information to the intersection control apparatus 3 at predetermined intervals. The vehicle information includes the current location information acquired by the current location information acquisition unit 12 and the vehicle velocity information acquired by the vehicle velocity information acquisition unit 15. The predetermined interval is, for example, but not limited to 1 second. The vehicle information further includes the track information indicating a track at the intersection 1 that the vehicle is currently approaching.

The intersection control information reception unit 17 receives intersection control information from the intersection control apparatus 3. The intersection control information indicates a permitted track of the vehicle 2 at the intersection 1, like a traffic signal light installed at the intersection 1. Details of the intersection control information will be described later.

The intersection entry determination unit 18 determines whether or not to permit an entry into the intersection 1 based on the intersection control information received by the intersection control information reception unit 17. The automatic driving control unit 14 makes the vehicle 2 enter the intersection 1 or makes the vehicle 2 wait before the intersection 1 based on the determination result by the intersection entry determination unit 18.

Figure 3:
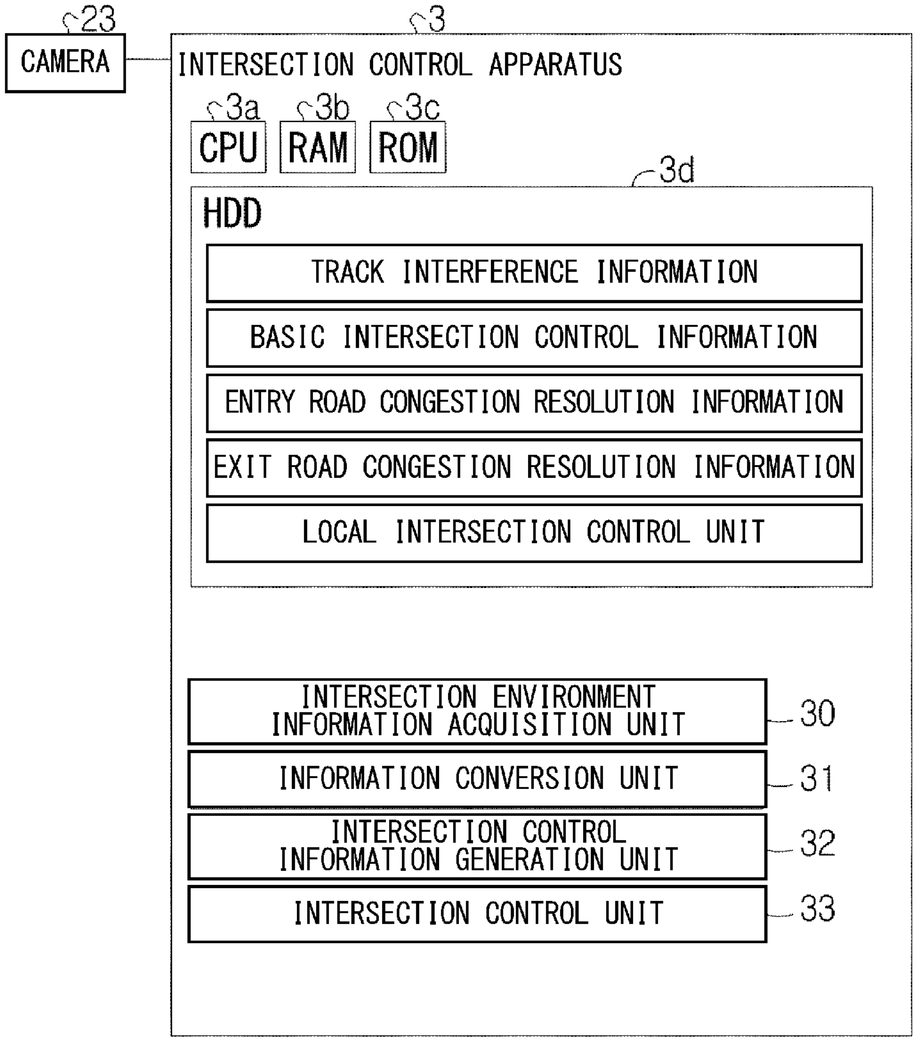
FIG. 3 is a functional block diagram of an intersection control apparatus.

FIG. 3 shows is a functional block diagram of the intersection control apparatus 3. As shown in FIG. 3, the intersection control apparatus 3 includes a CPU 3*a* (Central Processing Unit), a RAM 3*b* (Random Access Memory) that can be freely read and written, a ROM 3*c* (Read Only Memory), and an HDD 3d (Hard Disk Drive). A camera 23 for monitoring the intersection 1 and the surroundings of the intersection 1 is connected to the intersection control apparatus 3. When the CPU 3*a* reads and executes the control program stored in the ROM 3*c*, the control program makes hardware such as the CPU 3*a* function as an intersection environment information acquisition unit 30, an information conversion unit 31, an intersection control information generation unit 32, and an intersection control unit 33.

Track interference information, basic intersection control information, entry road congestion resolution control information, exit road congestion resolution information, and local intersection control information are stored in the HDD 3d.

The track interference information indicates interference between tracks at the intersection 1. "A track A and a track B interfere with each other" means that the vehicle 2 traveling along the track A and the vehicle 2 traveling along the track B may collide with each other in the intersection 1. Typically, if the tracks A and B intersect at the intersection 1, and if the tracks A and B merge at the intersection 1, the tracks A and B may interfere with each other in the intersection 1.

FIG. 4 shows the track interference information in a matrix form. As shown in FIG. 4, the track interference information can typically be represented in a two-dimensional bit array. In FIG. 4, "1→2" indicates "a track in which a vehicle enters the intersection 1 from the road R1 and exits to the road R2". Similarly, "3→2" indicates "a track in which a vehicle enters the intersection 1 from the road R3 and exits to the road R2". The track indicated by "1→2" and the track indicated by "3→2" interfere with each other, because they merge at the intersection 1. In the track interference information, a bit corresponding to the combination of tracks that interfere with each other is set to "1", and a bit corresponding to the combination of tracks that do not interfere with each other is set to "0". As shown in FIG. 4, the track interference information is a symmetric matrix.

The basic intersection control information includes a plurality of the basic intersection control information pieces that are different from each other. Each basic intersection control information piece indicates whether or not the vehicles 2 are permitted to travel on each track at the intersection 1. The plurality of tracks permitted in each piece of the basic intersection control information are configured not to interfere with each other. That is, the plurality of vehicles 2 passing through the intersection 1 at the same time do not collide with each other as long as they follow the same basic intersection control information.

FIG. 5 shows the basic intersection control information. Specifically, FIG. 5 shows the plurality of basic intersection control information pieces identified by Nos. 1 to 17.

In this embodiment, each basic intersection control information piece is composed of a 12 bit array. FIG. 6 shows the correspondence relationship between each bit of the bit array of the basic intersection control information and the track. As shown in FIG. 6, a 1st bit of the basic intersection control information corresponds to a track in which a vehicle enters the intersection 1 from the road R1, turns left at the intersection 1, and exits the road R2.

Similarly, a 2nd bit of the basic intersection control information corresponds to a track in which a vehicle enters the intersection 1 from the road R1, goes straight through the intersection 1, and exits the road R3.

Similarly, a 3rd bit of the basic intersection control information corresponds to a track in which a vehicle enters the intersection 1 from the road R1, turns right at the intersection 1, and exits the road R2.

Similarly, a 4th bit of the basic intersection control information corresponds to a track in which a vehicle enters the intersection 1 from the road R2, turns left at the intersection 1, and exits the road R3.

Similarly, a 5th bit of the basic intersection control information corresponds to a track in which a vehicle enters the intersection 1 from the road R2, goes straight through the intersection 1, and exits the road R4.

Similarly, a 6th bit of the basic intersection control information corresponds to a track in which a vehicle enters the intersection 1 from the road R2, turns right at the intersection 1, and exits the road R1.

Similarly, a 7th bit of the basic intersection control information corresponds to a track in which a vehicle enters the intersection 1 from the road R3, turns left at the intersection 1, and exits the road R4.

Similarly, an 8th bit of the basic intersection control information corresponds to a track in which a vehicle enters the intersection 1 from the road R3, goes straight through the intersection 1, and exits the road R1.

Similarly, a 9th bit of the basic intersection control information corresponds to a track in which a vehicle enters the intersection 1 from the road R3, turns right at the intersection 1, and exits the road R2.

Similarly, a 10th bit of the basic intersection control information corresponds to a track in which a vehicle enters the intersection 1 from the road R4, turns left at the intersection 1, and exits the road R1.

Similarly, an 11th bit of the basic intersection control information corresponds to a track in which a vehicle enters the intersection 1 from the road R4, goes straight through the intersection 1, and exits the road R2.

Similarly, a 12th bit of the basic intersection control information corresponds to a track in which a vehicle enters the intersection 1 from the road R4, turns right at the intersection 1, and exits the road R3.

Each of the roads R1 to R4 connected to the intersection 1 shown in FIG. 1 is one lane on one side, and there are three exit roads for one entry road, and there are four entry roads. Therefore, the number of tracks in the intersection 1 is the number of exit roads for one entry road multiplied by the number of entry roads. Therefore, one basic intersection control information piece can be represented by a 12 bit array. If the intersection 1 is a three-way junction connected by three roads each consisting of one lane on one side, one basic intersection control information piece can be represented by a 6 bit array. If the intersection 1 is a five-way junction connected by five roads each consisting of one lane on one side, one basic intersection control information piece can be represented by a 20 bit array.

For example, in the basic intersection control information, when the value of the first bit is "1", it means that a vehicle is permitted to travel along the track indicated by "1→2". On the other hand, when the value of the first bit is "0", it means that a vehicle is prohibited from traveling along the track indicated by "1→2".

Figure 7:
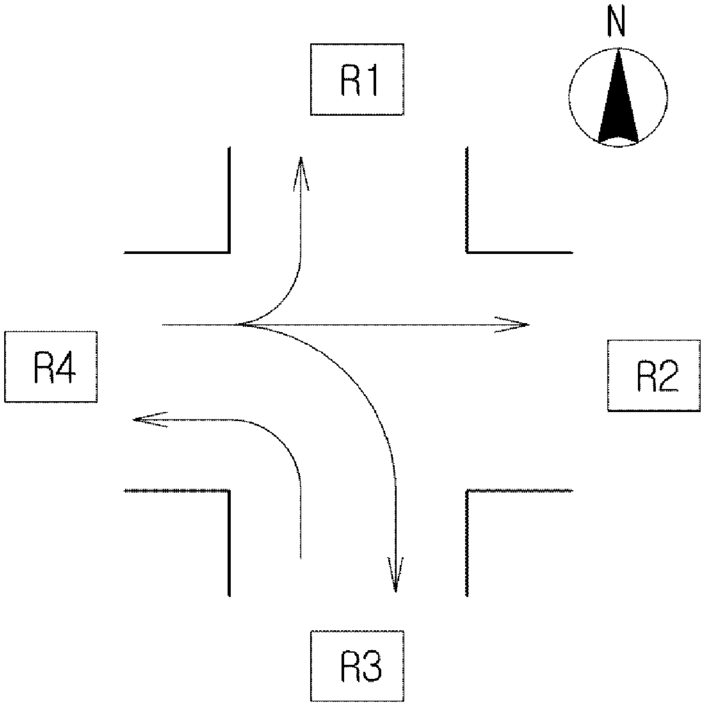
FIG. 7 shows visualization of the basic intersection control information of No. 1.

Returning to FIG. 5, the basic intersection control information of No. 1 is "1" for 7th, 10th, 11th, and 12th bits, and "0" for other bits. Therefore, the basic intersection control information of No. 1 permits "a track in which a vehicle enters the intersection 1 from the road R3, turns left at the intersection 1, and exits to the road R4", "a track in which a vehicle enters the intersection 1 from the road R4, turns left at the intersection 1, and exits to the road R1", "a track in which a vehicle enters the intersection 1 from the road R4, goes straight through the intersection 1, and exits to the road R2", and "a track in which a vehicle enters the intersection 1 from the road R4, turns right at the intersection 1, and exits to the road R3", as shown in FIG. 7. As shown in FIG. 7, the four tracks permitted by the basic intersection control information of No. 1 do not interfere with each other. Therefore, as long as vehicles travel according to the intersection control information of No. 1, they do not collide with each other while passing through the intersection 1.

Figure 8:
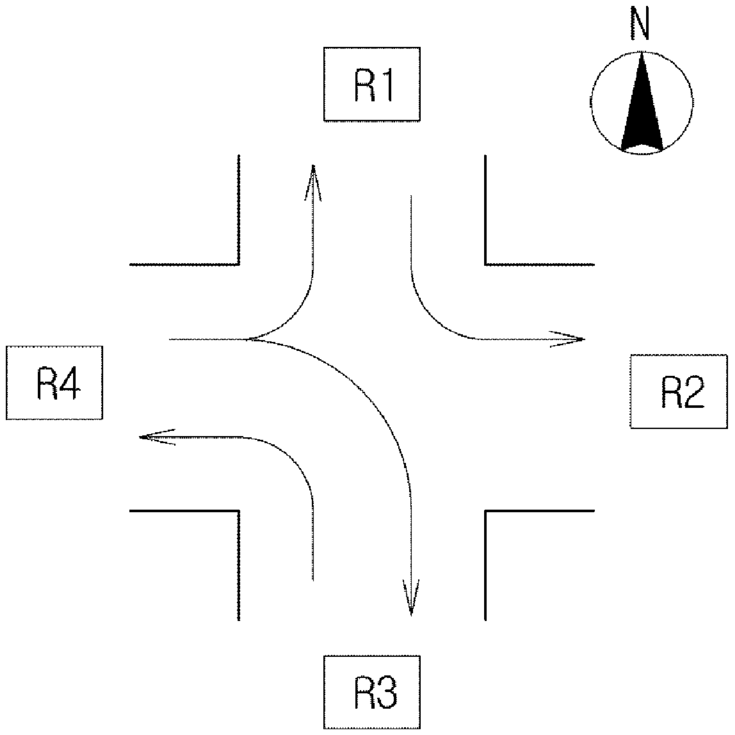
FIG. 8 shows visualization of the basic intersection control information of No. 5; No. 9.

Returning to FIG. 5, the basic intersection control information of No. 5 is "1" for 1st, 7th, 10th, and 12th bits, and "0" for other bits. Therefore, the basic intersection control information of No. 5 permits "a track in which a vehicle enters the intersection 1 from the road R1, turns left at the intersection 1, and exits to the road R2", "a track in which a vehicle enters the intersection 1 from the road R3, turns left at the intersection 1, and exits to the road R4", "a track in which a vehicle enters the intersection 1 from the road R4, turns left at the intersection 1, and exits to the road R1", "a track in which a vehicle enters the intersection 1 from the road R4, turns right at the intersection 1, and exits to the road R3", as shown in FIG. 8. As shown in FIG. 8, the four tracks permitted by the basic intersection control information of No. 5 do not interfere with each other. Therefore, as long as vehicles travel according to the intersection control information of No. 5, they do not collide with each other while passing through the intersection 1.

Figure 9:
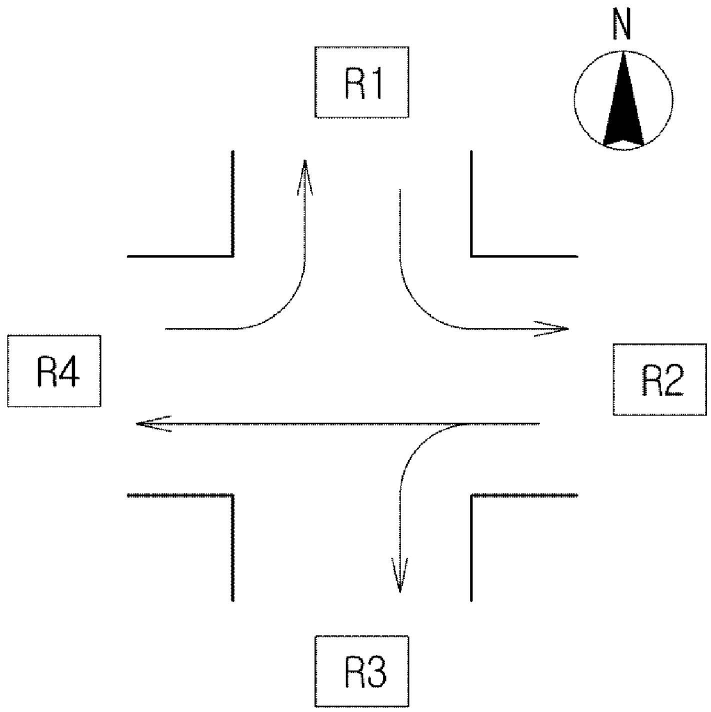

Returning to FIG. 5, the basic intersection control information of No. 9 is "1" for 1st, 4th, 5th, and 10th bits, and "0" for other bits. Therefore, the basic intersection control information of No. 9 permits "a track in which a vehicle enters the intersection 1 from the road R1, turns left at the intersection 1, and exits to the road R2", "a track in which a vehicle enters the intersection 1 from the road R2, turns left at the intersection 1, and exits to the road R3", "a track in which a vehicle enters the intersection 1 from the road R2, goes straight through the intersection 1, and exits to the road R4", and "a track in which a vehicle enters the intersection 1 from the road R4, turns left at the intersection 1, and exits to the road R1", as shown in FIG. 9. As shown in FIG. 9, the four tracks permitted by the basic intersection control information of No. 9 do not interfere with each other. Therefore, as long as vehicles travel according to the intersection control information of No. 9, they do not collide with each other while passing through the intersection 1.

Figure 10:
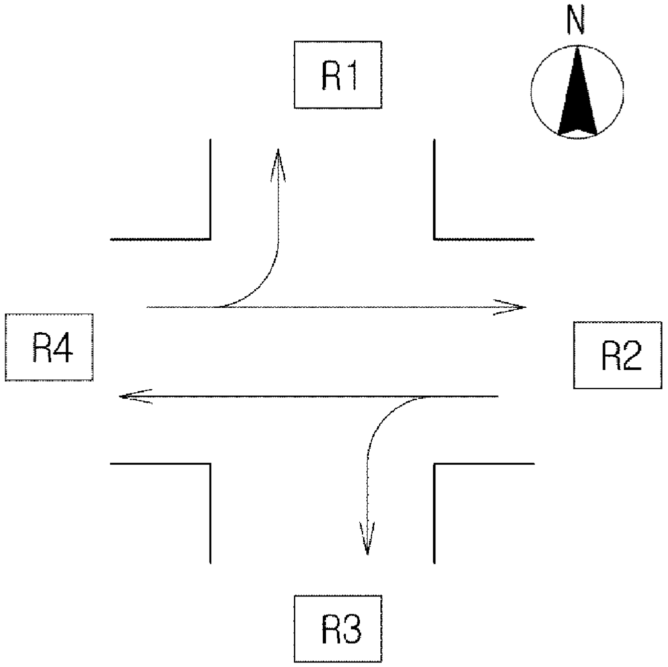
FIG. 10 shows visualization of the basic intersection control information of No. 13.

Returning to FIG. 5, the basic intersection control information of No. 13 is "1" for 4th, 5th, 10th, and 11th bits, and "0" for other bits. Therefore, the basic intersection control information of No. 13 permits "a track in which a vehicle enters the intersection 1 from the road R2, turns left at the intersection 1, and exits to the road R3", "a track in which a vehicle enters the intersection 1 from the road R2, goes straight through the intersection 1, and exits to the road R4", "a track in which a vehicle enters the intersection 1 from the road R4, turns left at the intersection 1, and exits to the road R1", and "a track in which a vehicle enters the intersection 1 from the road R4, goes straight through the intersection 1, and exits to the road R2", as shown in FIG. 10. As shown in FIG. 10, the four tracks permitted by the basic intersection control information of No. 13 do not interfere with each other. Therefore, as long as vehicles travel according to the intersection control information of No. 13, they do not collide with each other while passing through the intersection 1.

Figure 11:
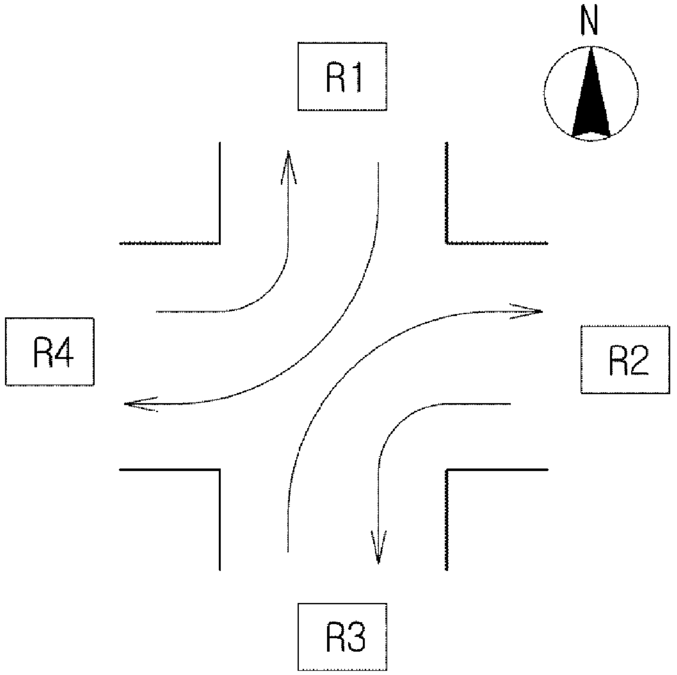
FIG. 11 shows visualization of the basic intersection control information of No. 15.

Returning to FIG. 5, the basic intersection control information of No. 15 is "1" for 3rd, 4th, 9th, and 10th bits, and "0" for other bits. Therefore, the basic intersection control information of No. 15 permits "a track in which a vehicle enters the intersection 1 from the road R1, turns right at the intersection 1, and exits to the road R4", "a track in which a vehicle enters the intersection 1 from the road R2, turns left at the intersection 1, and exits to the road R3", "a track in which a vehicle enters the intersection 1 from the road R3, turns right at the intersection 1, and exits to the road R2", and "a track in which a vehicle enters the intersection 1 from the road R4, turns left at the intersection 1, and exits to the road R1", as shown in FIG. 11. As shown in FIG. 11, the four tracks permitted by the basic intersection control information of No. 15 do not interfere with each other. Therefore, as long as vehicles travel according to the intersection control information of No. 15, they do not collide with each other while passing through the intersection 1.

Figure 12:
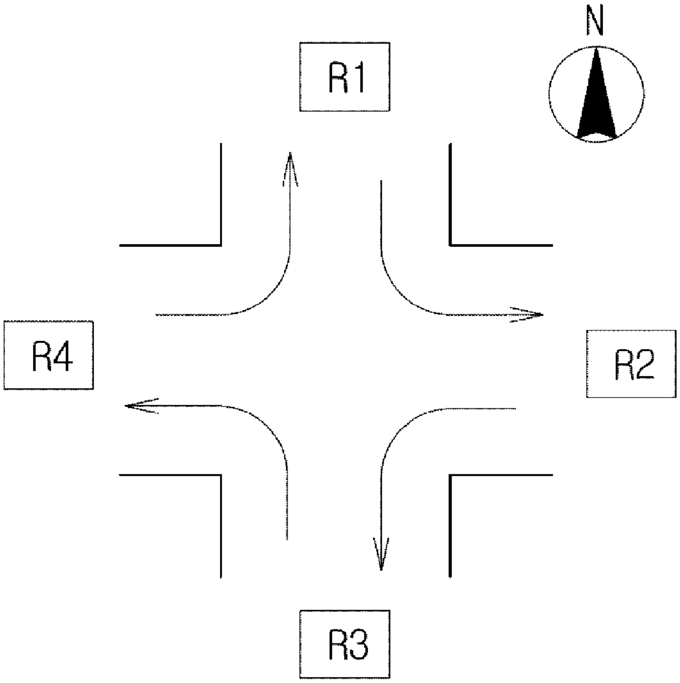
FIG. 12 shows visualization of the basic intersection control information of No. 17.

Returning to FIG. 5, the basic intersection control information of No. 17 is "1" for 1st, 4th, 7th, and 10th bits, and "0" for other bits. Therefore, the basic intersection control information of No. 17 permits "a track in which a vehicle enters the intersection 1 from the road R1, turns left at the intersection 1, and exits to the road R2", "a track in which a vehicle enters the intersection 1 from the road R2, turns left at the intersection 1, and exits to the road R3", "a track in which a vehicle enters the intersection 1 from the road R3, turns left at the intersection 1, and exits to the road R4", and "a track in which a vehicle enters the intersection 1 from the road R4, turns left at the intersection 1, and exits to the road R1", as shown in FIG. 12. As shown in FIG. 12, the four tracks permitted by the basic intersection control information of No. 17 do not interfere with each other. Therefore, as long as vehicles travel according to the intersection control information of No. 17, they do not collide with each other while passing through the intersection 1.

The entry road congestion resolution control information includes a plurality of entry road congestion resolution control information pieces. Each entry road congestion resolution control information piece indicates traffic control information for resolving congestion on the entry road to the intersection 1. FIG. 13 shows the entry road congestion resolution control information. As shown in FIG. 13, each entry road congestion resolution control information piece is represented by a 12 bit array, in a manner similar to the basic intersection control information. The correspondence between each bit and track in the bit array is shown in FIG. 6.

The entry road congestion resolution control information of No. 1 is traffic control information for resolving congestion on the entry road from the road R1 to the intersection 1. The entry road congestion resolution control information of No. 1 is "1" for 1st, 2nd, 3rd, and 10th bits, and "0" for other bits. Therefore, the entry road congestion resolution control information of No. 1 permits "a track in which a vehicle enters the intersection 1 from the road R1, turns left at the intersection 1, and exits to the road R2", "a track in which a vehicle enters the intersection 1 from the road R1, goes straight through the intersection 1, and exits to the road R3", "a track in which a vehicle enters the intersection 1 from the road R1, turns right at the intersection 1, and exits to the road R4", and "a track in which a vehicle enters the intersection 1 from the road R4, turns left at the intersection 1, and exits to the road R1". That is, the entry road congestion resolution control information of No. 1 actively resolves congestion on the entry road from the road R1 to the intersection 1 by permitting any track entering from the road R1 to the intersection 1. The entry road congestion resolution control information of No. 1 is the same as the basic intersection control information of No. 2 shown in FIG. 5.

Returning to FIG. 13, the entry road congestion resolution control information of No. 2 is traffic control information for resolving congestion on the entry road from the road R2 to the intersection 1. The entry road congestion resolution control information of No. 2 is "1" for 1st, 4th, 5th, and 6th bits, and "0" for other bits. Therefore, the entry road congestion resolution control information of No. 2 permits "a track in which a vehicle enters the intersection 1 from the road R1, turns left at the intersection 1, and exits to the road R2", "a track in which a vehicle enters the intersection 1 from the road R2, turns left at the intersection 1, and exits to the road R3", "a track in which a vehicle enters the intersection 1 from the road R2, goes straight through the intersection 1, and exits to the road R4", and "a track in which a vehicle enters the intersection 1 from the road R2, turns right at the intersection 1, and exits to the road R1". In other words, the entry road congestion resolution control information of No. 2 actively resolves congestion on the entry road from the road R2 to the intersection 1 by permitting any track entering from the road R2 to the intersection 1. The entry road congestion resolution control information of No. 2 is the same as the basic intersection control information of No. 3 shown in FIG. 5.

Returning to FIG. 13, the entry road congestion resolution control information of No. 3 is traffic control information for resolving congestion on the entry road from the road R3 to the intersection 1. The entry road congestion resolution control information of No. 3 is "1" for 4th, 7th, 8th, and 9th bits, and "0" for other bits. Therefore, the entry road congestion resolution control information of No. 3 permits "a track in which a vehicle enters the intersection 1 from the road R2, turns left at the intersection 1, and exits to the road R3", "a track in which a vehicle enters the intersection 1 from the road R3, turns left at the intersection 1, and exits to the road R4", "a track in which a vehicle enters the intersection 1 from the road R3, goes straight through the intersection 1, and exits to the road R1", and "a track in which a vehicle enters the intersection 1 from the road R3, turns right at the intersection 1, and exits to the road R2". That is, the entry road congestion resolution control information of No. 3 actively resolves congestion on the entry road from the road R3 to the intersection 1 by permitting any track entering from the road R3 to the intersection 1. The entry road congestion resolution control information of No. 3 is the same as the basic intersection control information of No. 4 shown in FIG. 5.

Returning to FIG. 13, the entry road congestion resolution control information of No. 4 is traffic control information for resolving congestion on the entry road from the road R4 to the intersection 1. The entry road congestion resolution control information of No. 4 is "1" for 7th, 10th, 11th, and 12th bits, and "0" for other bits. Therefore, the entry road congestion resolution control information of No. 4 permits "a track in which a vehicle enters the intersection 1 from the road R3, turns left at the intersection 1, and exits to the road R4", "a track in which a vehicle enters the intersection 1 from the road R4, turns left at the intersection 1, and exits to the road R1", "a track in which a vehicle enters the intersection 1 from the road R4, goes straight through the intersection 1, and exits to the road R2", and "a track in which a vehicle enters the intersection 1 from the road R4, turns right at the intersection 1, and exits to the road R3". That is, the entry road congestion resolution control information of No. 4 actively resolves congestion on the entry road from the road R4 to the intersection 1 by permitting any track entering from the road R4 to the intersection 1. The entry road congestion resolution control information of No. 4 is the same as the basic intersection control information of No. 1 shown in FIG. 5.

The exit road congestion resolution information includes a plurality of the exit road congestion resolution information pieces. Each of the exit road congestion resolution information piece indicates information for resolving congestion on the exit road by suppressing exits to a specific exit road. FIG. 14 shows the exit road congestion resolution information. As shown in FIG. 14, each of the exit road congestion resolution information piece is represented by a 12 bit array in a manner similar to the basic intersection control information. The correspondence between each bit and track in the bit array is shown in FIG. 6. However, simply for the convenience of operation, when the value of each bit is "1", a vehicle is prohibited from traveling along the corresponding track, while when the value of each bit is "0", a vehicle is permitted to travel along the corresponding track.

The exit road congestion resolution information of No. 1 is for resolving congestion on the road R1, which is the exit road for the intersection 1. The exit road congestion resolution information of No. 1 is "1" for 6th, 8th, and 10th bits, and "0" for other bits. Therefore, the exit road congestion resolution information of No. 1 prohibits "a track in which a vehicle enters the intersection 1 from the road R2, turns right at the intersection 1, and exits to the road R1", "a track in which a vehicle enters the intersection 1 from the road R3, goes straight through the intersection 1, and exits to the road R1", and "a track in which a vehicle enters the intersection 1 from the road R4, turns left at the intersection 1, and exits to road R1". That is, the exit road congestion resolution information of No. 1 is used to actively resolve congestion on the road R1, which serves as an exit road for the intersection 1, by prohibiting all tracks that use the road R1 as an exit road.

The exit road congestion resolution information of No. 2 is for resolving congestion on the road R2, which is the exit road for the intersection 1. The exit road congestion resolution information of No. 2 is "1" for 1st, 9th, and 11th bits, and "0" for other bits. Therefore, the exit road congestion resolution information of No. 2 prohibits "a track in which a vehicle enters the intersection 1 from the road R1, turns left at the intersection 1, and exits to the road R2", "a track in which a vehicle enters the intersection 1 from the road R3, turns right at the intersection 1, and exits to the road R2", and "a track in which a vehicle enters the intersection 1 from the road R4, goes straight through the intersection 1, and exits to road R2". That is, the exit road congestion resolution information of No. 2 is used to actively resolve congestion on the road R2, which serves as an exit road for the intersection 1, by prohibiting all tracks that use the road R2 as an exit road.

The exit road congestion resolution information of No. 3 is for resolving congestion on the road R3, which is the exit road for the intersection 1. The exit road congestion resolution information of No. 3 is "1" for 2nd, 4th, and 12th bits, and "0" for other bits. Therefore, the exit road congestion resolution information of No. 3 prohibits "a track in which a vehicle enters the intersection 1 from the road R1, goes straight through the intersection 1, and exits to the road R3", "a track in which a vehicle enters the intersection 1 from the road R2, turns left at the intersection 1, and exits to the road R3", and "a track in which a vehicle enters the intersection 1 from the road R4, turns right at the intersection 1, and exits to road R3". That is, the exit road congestion resolution information of No. 3 is used to actively resolve congestion on the road R3, which serves as an exit road for the intersection 1, by prohibiting all tracks that use the road R3 as an exit road. The exit road congestion resolution information of No. 4 is for resolving congestion on the road R4, which is the exit road for the intersection 1. The exit road congestion resolution information of No. 4 is "1" for 3rd, 5th, and 7th bits, and "0" for other bits. Therefore, the exit road congestion resolution information of No. 4 prohibits "a track in which a vehicle enters the intersection 1 from the road R1, turns right at the intersection 1, and exits to the road R4", "a track in which a vehicle enters the intersection 1 from the road R2, goes straight through the intersection 1, and exits to the road R4", and "a track in which a vehicle enters the intersection 1 from the road R3, turns left at the intersection 1, and exits to road R4". That is, the exit road congestion resolution information of No. 4 is used to actively resolve congestion on the road R4, which serves as an exit road for the intersection 1, by prohibiting all tracks that use the road R4 as an exit road.

The local intersection control information is intersection control information currently used to control the entries of the vehicles 2 into the intersection 1. That is, the intersection control apparatus 3 can refer to the local intersection control information when deciding the next intersection control information.

Returning to FIG. 3, the intersection environment information acquisition unit 30 acquires a plurality of types of intersection environment information. The plurality of types of intersection environment information include intersection entry information, pedestrian crossing information, local intersection control information, adjacent intersection control information, and congestion information. The plurality of types of intersection environment information may include at least two types of the intersection entry information, the pedestrian crossing information, the local intersection control information, the adjacent intersection control information, and the congestion information.

The intersection entry information indicates a track of the vehicle 2 approaching the intersection 1 when passing through the intersection 1. The intersection environment information acquisition unit 30 receives and acquires vehicle information including the track information at the intersection 1 from the plurality of vehicles 2 approaching the intersection 1. Alternatively, the intersection environment information acquisition unit 30 may generate the intersection entry information based on image information acquired from the camera 23 and then acquire it. In the example of FIG. 1, the intersection entry information acquired by the intersection environment information acquisition unit is expressed as text data "12" indicating the track of "1→2", text data "R1R2" indicating the track of "1→2", or in any other data format.

The information conversion unit 31 encodes the intersection entry information acquired by the intersection environment information acquisition unit into a predetermined bit length. That is, the information conversion unit 31 encodes the intersection entry information acquired by the intersection environment information acquisition unit 30 and stores it in a 12 bit array. The correspondence between each bit of this bit array and the track is shown in FIG. 6. Simply for the convenience of operation, each bit of the bit array is set to "1" when there is a vehicle 2 scheduled to travel along the corresponding track, while each bit of the bit array is set to "0" when there is no such vehicle. In the example of FIG. 1, there is a vehicle 2 approaching the intersection 1, entering the intersection 1 from the road R1, turning left at the intersection 1, and exiting to the road R2, and another vehicle 2 approaching the intersection 1, entering the intersection 1 from the road R4, turning right at the intersection 1, and exiting to the road R3. Therefore, the information conversion unit 31 converts the intersection entry information acquired by the intersection environment information acquisition unit into a bit array of "100 000 000 001".

The pedestrian crossing information is information indicating the pedestrian crossing road that the pedestrian P intends to cross among the plurality of roads connected to the intersection 1. The intersection environment information acquisition unit 30 typically generates the pedestrian crossing information based on the image information acquired from the camera 23 and then acquires it. In the example of FIG. 1, the pedestrian crossing information acquired by the intersection environment information acquisition unit 30 is expressed as text data "3" indicating the road R3, text data "C" indicating the road R3, or other data formats.

The information conversion unit 31 encodes the pedestrian crossing information acquired by the intersection environment information acquisition unit into a predetermined bit length. That is, the information conversion unit 31 encodes the pedestrian crossing information acquired by the intersection environment information acquisition unit 30 and stores it in a 12 bit array. The correspondence between each bit of this bit array and the track is shown in FIG. 6. Simply for the convenience of operation, each bit of the bit array is "1" when a vehicle is prohibited from traveling along the corresponding track, while when the value of each bit is "0", a vehicle is permitted to travel along the corresponding track. In the example of FIG. 1, there is the pedestrian P trying to cross the road R3. Therefore, the information conversion unit 31 converts the pedestrian crossing information acquired by the intersection environment information acquisition unit 30 into a bit array of "010 100 111 001".

The local intersection control information is the intersection control information currently used for control at the intersection 1. The intersection environment information acquisition unit 30 reads and acquires the local intersection control information from the HDD 3d. In this embodiment, the local intersection control information stored in the HDD 3d is represented by a 12 bit array as shown in FIG. 6. Alternatively, the intersection control information stored in the HDD 3d may be compressed data that is a compressed 12 bit array or other data formats.

When the local intersection control information acquired by the intersection environment information acquisition unit 30 is not encoded in a 12 bit array, the information conversion unit 31 encodes the local intersection control information and stores it in a 12 bit array. The correspondence between each bit of this bit array and the track is shown in FIG. 6. Simply for the convenience of operation, each bit of the bit array is "1" when a vehicle is permitted to travel along the corresponding track, while when the value of each bit is "0", a vehicle is prohibited from traveling along the corresponding track in a manner similar to the basic intersection control information.

The adjacent intersection control information is the intersection control information currently used for control at an intersection adjacent to the intersection 1. The intersection environment information acquisition unit 30 receives and acquires the adjacent intersection control information from the intersection control apparatus installed at the adjacent intersection. In this embodiment, adjacent intersection control information is represented by a 12 bit array as shown in FIG. 6. Alternatively, the adjacent intersection control information may be compressed data that is a compressed 12 bit array or other data formats.

When the adjacent intersection control information acquired by the intersection environment information acquisition unit 30 is not encoded in a 12 bit array, the information conversion unit 31 encodes the adjacent intersection control information and stores it in the 12 bit array.

The congestion information indicates a congested road among the plurality of roads connecting to the intersection 1. The intersection environment information acquisition unit 30 can generate the congestion information based on the image information acquired from the camera 23 and then acquires it. The intersection environment information acquisition unit 30 can generate the congestion information based on vehicle information received from the vehicle 2 traveling in the vicinity of the intersection 1 and then acquire it. The congestion information is expressed in the form of text data "31N" indicating the entry road side of the road R3, text data "3OUT" indicating the exit road side of the road R3, or other data formats.

When the congestion information acquired by the intersection environment information acquisition unit 30 is not encoded in a 12 bit array, the information conversion unit 31 encodes the congestion information and stores it in a 12 bit array. For example, when the congestion information is text data "30UT", the congestion information is converted into exit prohibited information of No. 3 with reference to the exit road congestion resolution information shown in FIG. 14.

The intersection control information generation unit 32 generates at least one intersection control information piece by integrating a plurality of types of the intersection environment information through a bit operation.

The intersection control unit 33 controls the entries of the vehicles 2 into the intersection 1 using at least one intersection control information piece generated by the intersection control information generation unit 32. Specifically, when the intersection control information generation unit 32 generates a plurality of the intersection control information pieces, the intersection control unit 33 selects the intersection control information piece with the highest throughput among the plurality of intersection control information pieces and distributes the selected intersection control information piece to the plurality of vehicles 2 scheduled to pass through the intersection 1. When the intersection control information generation unit 32 generates only one intersection control information piece, the intersection control unit 33 distributes the intersection control information piece to the plurality of vehicles 2 scheduled to pass through the intersection 1. The plurality of vehicles 2 scheduled to pass through the intersection 1 pass through the intersection 1 or wait before the intersection 1 based on the intersection control information piece received from the intersection control unit 33.

Next, the operation of the intersection control apparatus 3 is described with reference to FIGS. 15 to 19.

Figure 15:
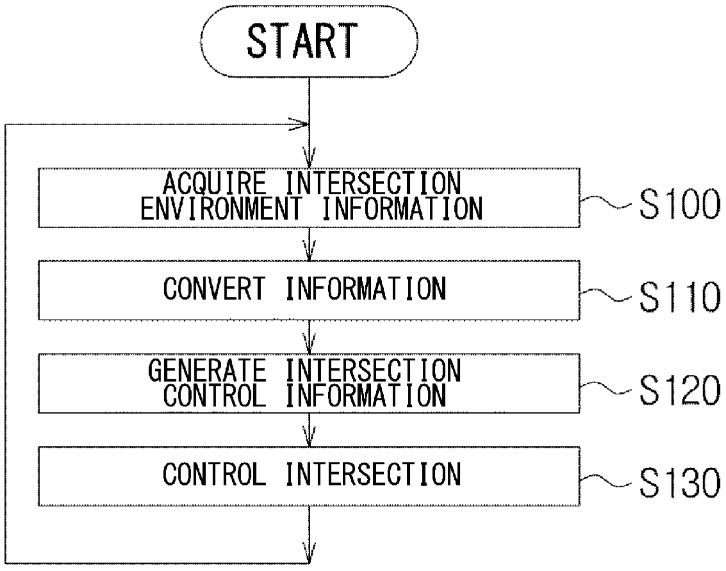
FIG. 15 shows an operation flow of the intersection control apparatus.

FIG. 15 shows an outline of an operation flow of the intersection control apparatus 3. As shown in FIG. 15, the intersection control method performed by the intersection control apparatus 3 includes an intersection environment information acquisition step (S100), an information conversion step (S110), an intersection control information generation step (S120), and an intersection control step (S130). The intersection control apparatus 3 typically performs the intersection environment information acquisition step (S100), the information conversion step (S110), the intersection control information generation step (S120), and the intersection control step (S130) every 5 seconds, in the order described. The intersection control apparatus 3 gradually changes the intersection control information currently used for intersection control at the intersection 1 according to the situation that changes from time to time. Specifically, by prohibiting some of the plurality of tracks permitted by the intersection control information currently used for intersection control at the intersection 1 or permitting some of the plurality of tracks prohibited by the intersection control information currently used for intersection control at the intersection 1, the intersection control apparatus 3 gradually changes the intersection control information currently used for intersection control at the intersection 1 according to the situation that changes from time to time. Prohibiting some of the plurality of permitted tracks would enable some of the plurality of prohibited tracks to be permitted instead.

In the intersection environment information acquisition step (S100), the intersection environment information acquisition unit 30 acquires the plurality of types of intersection environment information.

In the information conversion step (S110), the information conversion unit 31 encodes the plurality of types of intersection environment information pieces into a predetermined bit length.

In the intersection control information generation step (S120), the intersection control information generation unit 32 integrates the plurality of types of intersection environment information by a bit operation to generate at least one intersection control information piece.

In the intersection control step (S130), the intersection control unit 33 controls the entries of the vehicles 2 into the intersection 1 using at least one intersection control information piece.

The intersection control information generation step (S120) will be described in detail below with reference to FIG. 16.

Figure 16:
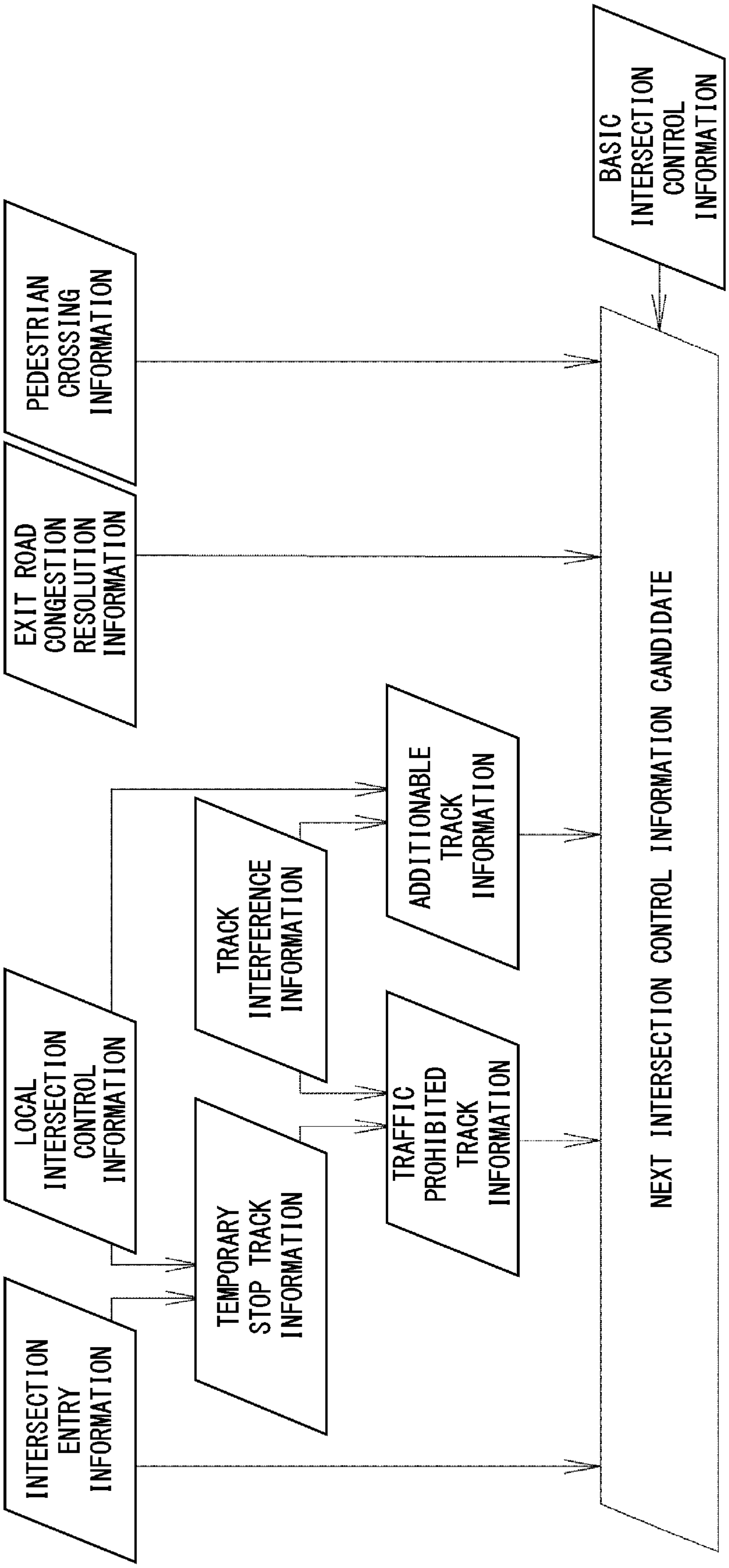
FIG. 16 shows an operation flow of the intersection control apparatus.

In FIG. 16, it is assumed that each of the intersection entry information, the local intersection control information, the exit road congestion resolution information, and the pedestrian crossing information has already been encoded into a predetermined bit length, i.e., 12 bits, by the information conversion unit 31.

First, the intersection control information generation unit 32 generates temporary stop track information based on the intersection entry information and the local intersection control information. The details of the temporary stop track information are as follows.

A mismatch occurs over time between the plurality of tracks permitted by the local intersection control information and the plurality of tracks scheduled to pass through which are actually present in the intersection entry information. That is, after some time has passed since the local intersection control information has begun to be used in the control of the intersection, there will be tracks which vehicles are not scheduled to pass therethrough among the plurality of tracks permitted by the local intersection control information. Excluding such tracks from the plurality of permitted tracks could result in permitting other prohibited tracks. Therefore, the intersection control information generation unit 32 first performs an EXOR operation on the intersection entry information and the local intersection control information, and then performs an AND operation on the operation result and the local intersection control information to generate the temporary stop track information.

As a specific example, if the local intersection control information is "100 111 000 000" and the intersection entry information is "000 111 000 010", a result of an EXOR operation on the local intersection control information and the intersection entry information is "100 000 000 010". When this operation result is ANDed with "100 111 000 000" of the local intersection control information, an operation result "100 000 000 000" is obtained as the temporary stop track information. This temporary stop track information suggests that a route, in which a vehicle enters the intersection 1 from the road R1, turns left at the intersection 1, and exits the road R2, should be switched to being prohibited, because this route is currently permitted but not expected to be used in the future.

Figure 17:
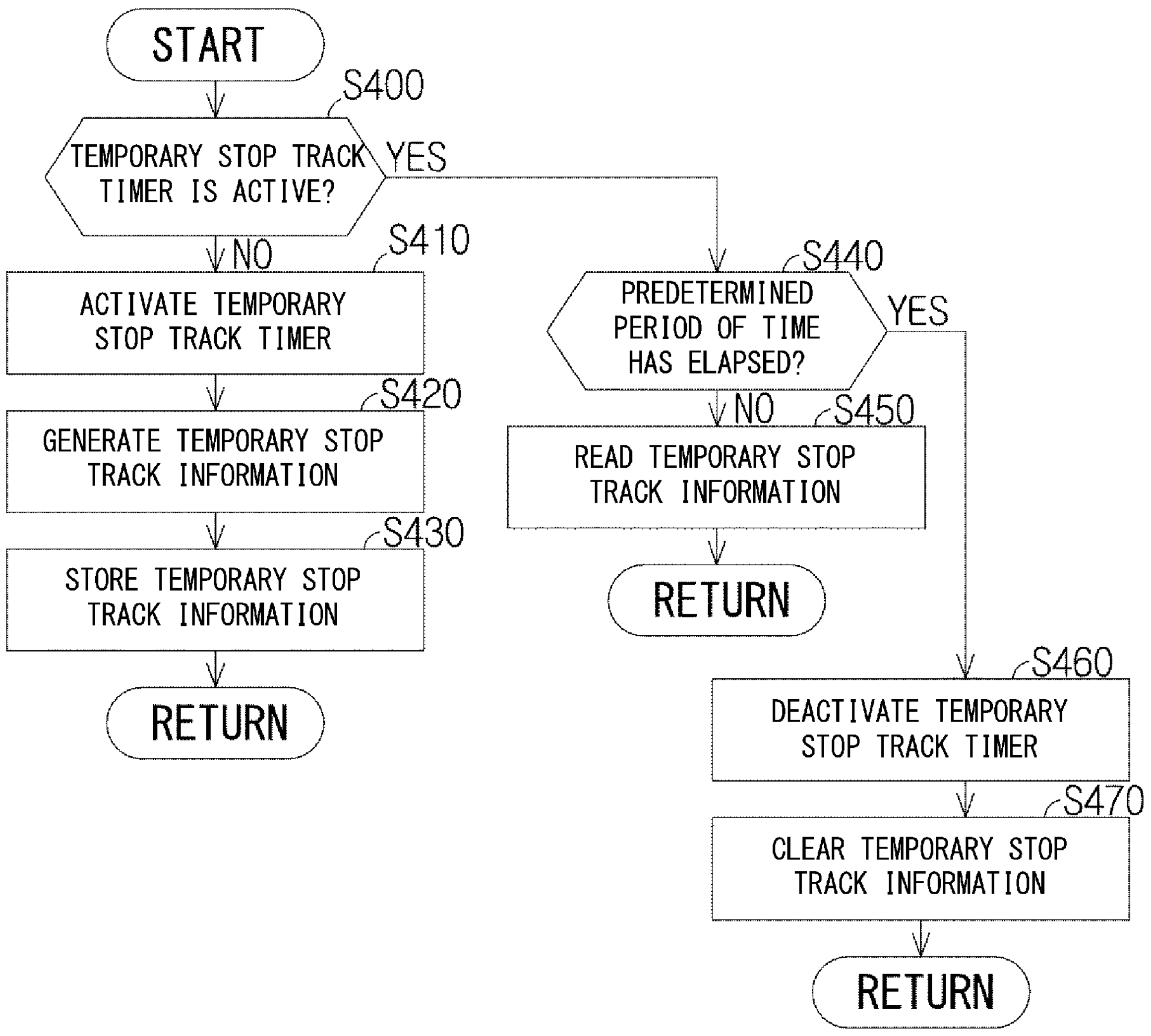
FIG. 17 shows an operation flow of the intersection control apparatus.

FIG. 17 shows a flow for holding the temporary stop track information continuously for a predetermined period of time.

Specifically, the intersection control information generation unit 32 has a temporary stop track timer. When the temporary stop track information is generated, the intersection control information generation unit 32 first determines whether or not the temporary stop track timer is active (S400). When the temporary stop track timer is not active (S400: NO), the intersection control information generation unit 32 activates the temporary stop track timer (S410), generates the temporary stop track information (S420), and stores the temporary stop track information in the RAM **3*b* (S430). On the other hand, when the temporary stop track timer is active (S400: YES) in S400, the intersection control information generation unit 32 determines whether a predetermined period of time has elapsed since the temporary stop track timer has become active (S440). When the predetermined period of time has not elapsed (S440: NO), the intersection control information generation unit 32 reads the temporary stop track information from the RAM 3*b* instead of generating the temporary stop track information (S450). On the other hand, if the predetermined period of time has elapsed in S440 (S440: YES), the intersection control information generation unit 32 deactivates the temporary stop track timer (S460) and clears the temporary stop track information, i.e., sets all bits to "0" (S470**).

The reason why the intersection control information generation unit 32 continuously holds the temporary stop track information for a predetermined period of time is to ensure an opportunity for the vehicle 2 remaining on the track which has been suggested to be switched from the state permitted by the temporary stop track information to the state prohibited by the temporary stop track information to exit from the intersection 1 without any problem.

Returning to FIG. 16, the intersection control information generation unit 32 generates traffic prohibited track information based on the temporary stop track information and the track interference information. The stop track information is used to prohibit the vehicles 2 remaining on a track proposed to be switched from a state permitted by the temporary stop track information to a state prohibited by the temporary stop track information so that the vehicle 2 remaining on the track exits from the intersection 1 without any problem.

For example, if the temporary stop track information is "100 001 000 000", the track "1→2" and the track "2→1" are to be temporarily stopped. Referring to the track interference information shown in FIG. 4, the intersection control information generation unit 32 acquires a bit array of "000 000 001 010" as the track interference information corresponding to the track "1→2". Similarly, the intersection control information generation unit 32 acquires a bit array of "011 000 011 110" as the track interference information corresponding to the track "2→1".

Next, the intersection control information generation unit 32 performs an OR operation on the bit array corresponding to the track "1→2" and the bit array corresponding to the track "2→1", and the bit array resulting from the operation, "011 000 011 110", is used as the traffic prohibited track information. By reflecting this traffic prohibited track information in the next intersection control information, it is possible to ensure exits of the vehicles 2 remaining in the intersection 1. The track corresponding to the bit whose value is "1" in this bit array is nothing less than a track in which passage is to be prohibited.

In addition, the intersection control information generation unit 32 generates additionable track information based on the local intersection control information and the track interference information. The additionable track information indicates a track that does not interfere with a track permitted by the local intersection control information.

For example, when the local intersection control information is "000 110 000 000", the track "2→3" and the track "2→4" are to be permitted. Referring to the track interference information shown in FIG. 4, the intersection control information generation unit 32 acquires a bit array of "010 000 000 001" as the track interference information corresponding to the track "2→3". Similarly, the intersection control information generation unit 32 acquires a bit array of "011 000 111 001" as the track interference information corresponding to the track "2→4". The intersection control information generation unit 32 performs an OR operation on the bit array corresponding to the track "2→3" and the bit array corresponding to the track "2→4", and the bit array resulting from the operation, "011 000 111 001", is used as the additionable track information. The track corresponding to the bit whose value is "1" in these bit arrays indicates a track that cannot be added to the local intersection control information.

Next, the intersection control information generation unit 32 generates 17 candidates for the next intersection control information by performing an AND operation with the 17 pieces of the basic intersection control information: a result of an NOT operation on the intersection entry information (the bit corresponding to the track in which the vehicle 2 is scheduled to pass becomes "1"), a result of an NOT operation on the prohibited track information (the bit corresponding to the track in which the vehicle 2 is scheduled to pass becomes "1"), a result of a NOT operation on the additionable track information (the bit corresponding to the track on which the vehicle 2 is prohibited becomes "1"), a result of a NOT operation on the exit road congestion resolution information (the bit corresponding to the track in which the vehicle 2 is not permitted becomes "1"), and a result of a NOT operation on the pedestrian crossing information (the bit corresponding to the track on which the vehicle 2 is not permitted becomes "1"). By using the basic intersection control information as a base when the candidates for the next intersection control information are generated in this way, a collision between the vehicles 2 in the intersection 1 can be surely prevented. However, the basic intersection control information may not be taken into account in the above AND operation.

Figure 18:
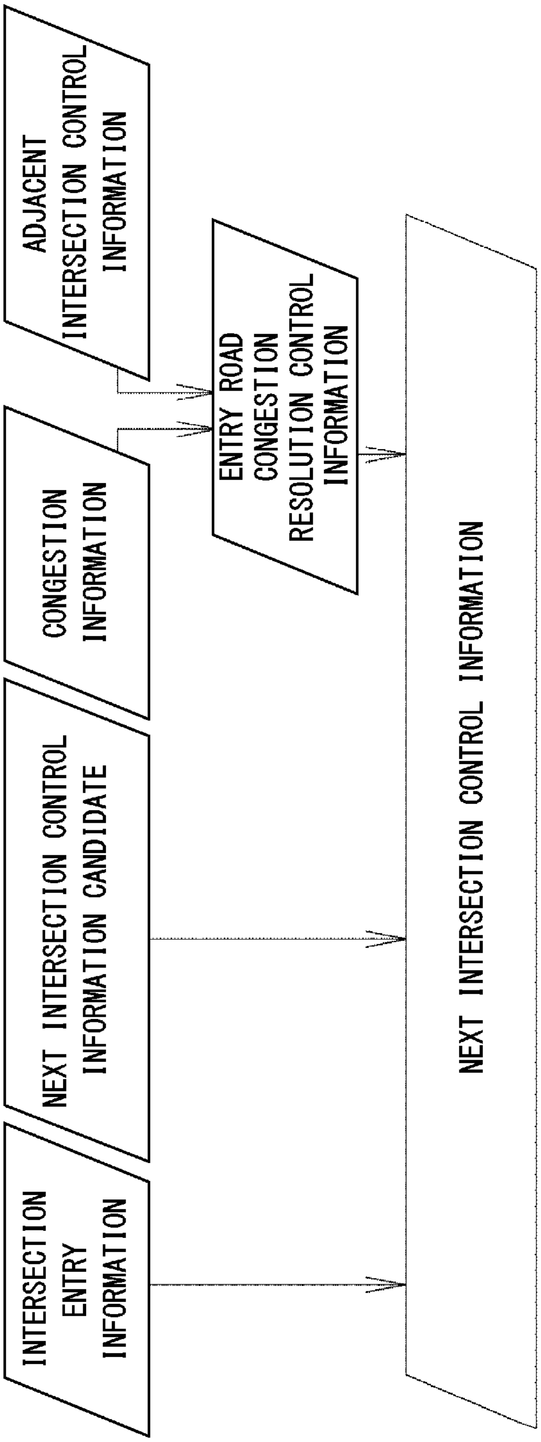
FIG. 18 shows an operation flow of the intersection control apparatus.

Next, the intersection control information generation unit 32 provisionally decides the next intersection control information based on the intersection entry information, the candidates for the next intersection control information, and the entry road congestion resolution control information with reference to FIG. 18. The intersection control information generation unit 32 determines or predicts whether or not there is congestion on the entry road to the intersection 1 based on the congestion information acquired by the intersection environment information acquisition unit 30 and the adjacent intersection control information acquired by the intersection environment information acquisition unit 30. If the intersection control information generation unit 32 determines that there is congestion on the entry road to the intersection 1 or if there is an entry road where congestion is expected to occur, it acquires the entry road congestion resolution control information to resolve the congestion on the entry road with reference to FIG. 13. For example, if the intersection control information generation unit 32 determines that there is congestion on the entry road belonging to the road R3, the intersection control information generation unit 32 acquires the entry road congestion resolution control information of No. 3 with reference to FIG. 13.

Figure 19:
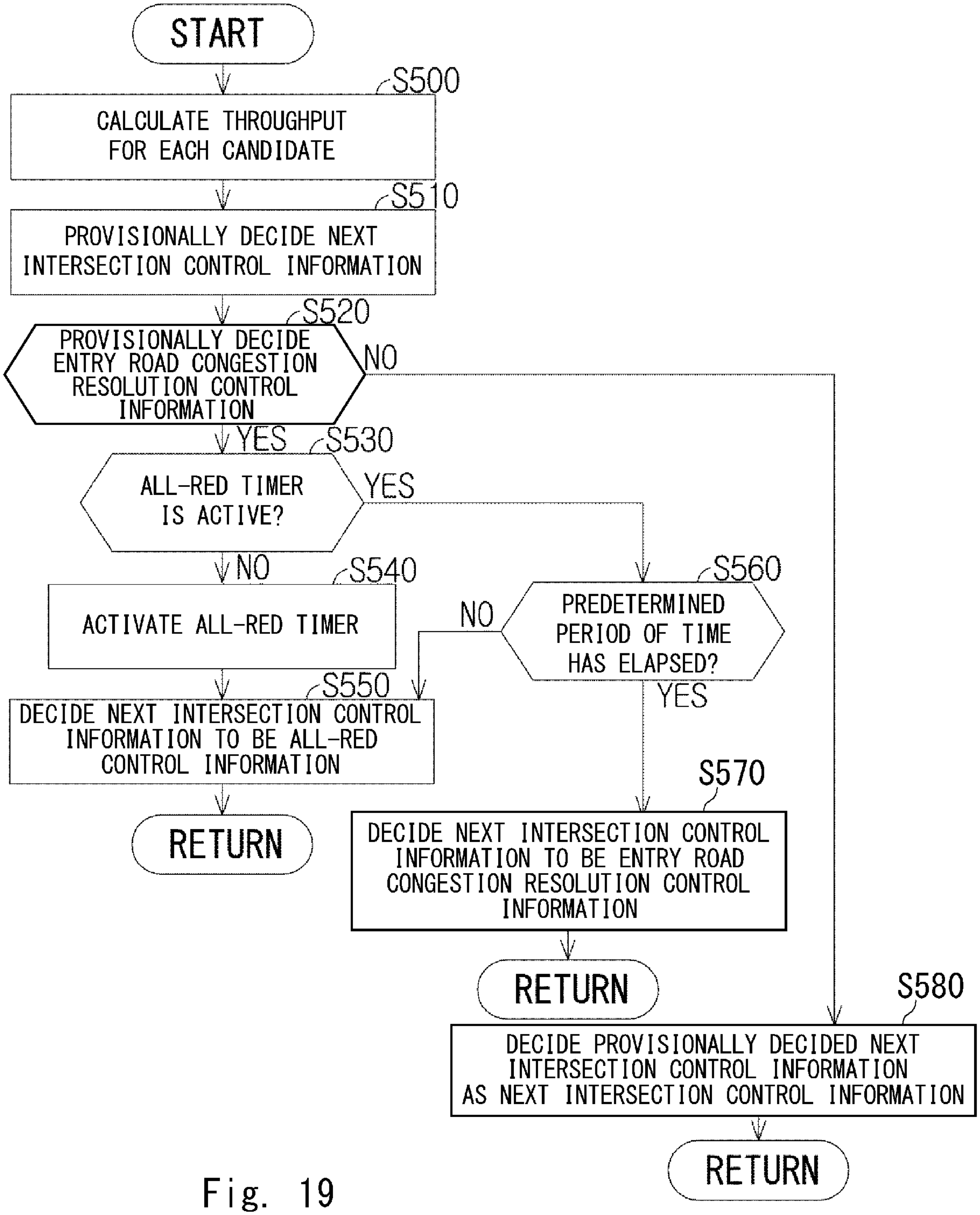
FIG. 19 shows an operation flow of the intersection control apparatus.

Next, as shown in FIG. 19, the intersection control information generation unit 32 calculates a throughput for each of the 18 candidates including the 17 candidates for the next intersection control information and the entry road congestion resolution control information based on the intersection entry information (S500), and provisionally decides the one with the highest throughput as the next intersection control information (S510). The throughput typically means the number of vehicles that can be processed per unit time at the intersection 1.

The intersection control information generation unit 32 has an all-red timer. When the intersection control information generation unit 32 provisionally decides entry road congestion resolution control information as the next intersection control information in S510 (S520: YES), the intersection control information generation unit 32 determines whether or not the all-red timer is active (S530). When the all-red timer is not active (S530: NO), the intersection control information generation unit 32 activates the all-red timer (S540) and decides the next intersection control information to be the all-red control information (S550). The all-red control information is the intersection control information that prohibits any track at the intersection 1 and is composed of a bit array of "000 000 000 000".

When the all-red timer is active in S530 (S530: YES), the intersection control information generation unit 32 determines whether a predetermined period of time has elapsed since the all-red timer is activated (S560). If it is determined that the predetermined period of time has not elapsed (S560: NO), the intersection control information generation unit 32 decides the next intersection control information to be the all-red control information (S550). On the other hand, if it is determined that the predetermined period of time has elapsed (S560: YES), the intersection control information generation unit 32 decides the next intersection control information to be the entry road congestion resolution control information (S570).

On the other hand, if the intersection control information generation unit 32 does not provisionally decide the entry road congestion resolution control information as the next intersection control information in S510 (S520: NO), the intersection control information generation unit 32 decides the provisionally decided next intersection control information as the next intersection control information (S580) and stores the decided next intersection control information as the local intersection control information in the HDD 3d shown in FIG. 3.

As described above, the embodiment of the present disclosure has the following features.

The intersection control apparatus 3 (intersection control system) controls entries of the vehicles 2 into the intersection 1. The intersection control apparatus 3 includes: the intersection environment information acquisition unit 30 configured to acquire a plurality of types of intersection environment information; the information conversion unit 31 configured to encode the intersection environment information into a predetermined bit length for each type of the intersection environment information; the intersection control information generation unit 32 configured to generate at least one intersection control information piece by integrating the plurality of types of intersection environment information through bit operations; and an intersection control unit 33 configured to control the entries of the vehicles 2 into the intersection 1 using the at least one intersection control information piece. According to the above configuration, it is possible to respond quickly to the situation that changes from time to time when entries of the vehicles 2 into the intersection 1 is controlled.

Further, the plurality of types of intersection environment information include at least two of: the intersection entry information indicating a track of the vehicle 2 attempting to enter the intersection 1 when the vehicle 2 passes through the intersection; the pedestrian crossing information indicating the pedestrian P crossing road that a pedestrian intends to cross among a plurality of roads connected to the intersection 1; local intersection control information currently being used for the control at the intersection 1; the adjacent intersection control information currently being used for control at an intersection adjacent to the intersection 1; and the congestion information indicating a congested road among the plurality of roads connected to the intersection 1. According to the above configuration, the intersection control information can be generated based on various environments around the intersection 1.

Further, the at least one intersection control information piece includes a plurality of intersection control information pieces. The intersection control unit 33 may be configured to select one of the plurality of intersection control information pieces with a highest throughput among the plurality of intersection control information pieces, and control the entries of the vehicles 2 into the intersection 1 using the selected intersection control information piece. According to the above configuration, the number of vehicles that can be processed per unit time at the intersection 1 can be effectively ensured.

The predetermined bit length may be set according to the number of combinations of the entry road to the intersection 1 and the exit road from the intersection 1. According to the above configuration, the predetermined bit length is reasonably defined.

In addition, the intersection control unit 33 may transmit at least one intersection control information piece to the vehicle 2 attempting to enter the intersection 1. According to the above configuration, a signal light can be omitted.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An intersection control system for controlling entries of vehicles into an intersection, the intersection control system comprising:

an intersection environment information acquisition unit configured to acquire a plurality of types of intersection environment information;

an information conversion unit configured to encode the intersection environment information into a predetermined bit length for each type of the intersection environment information;

an intersection control information generation unit configured to generate at least one intersection control information piece by integrating the plurality of types of intersection environment information through bit operations; and an intersection control unit configured to control the entries of the vehicles into the intersection using the at least one intersection control information piece.

2. The intersection control system according to claim 1, wherein the plurality of types of intersection environment information include at least two of:

intersection entry information indicating a track of the vehicle attempting to enter the intersection when the vehicle passes through the intersection;

pedestrian crossing information indicating a pedestrian crossing road that a pedestrian intends to cross among a plurality of roads connected to the intersection;

local intersection control information currently being used for the control at the intersection;

adjacent intersection control information currently being used for control at an intersection adjacent to the intersection; and congestion information indicating a congested road among the plurality of roads connected to the intersection.

3. The intersection control system according to claim 1, wherein the at least one intersection control information includes a plurality of intersection control information pieces, and the intersection control unit is configured to select one of the plurality of intersection control information pieces with a highest throughput among the plurality of intersection control information pieces, and control the entries of the vehicles into the intersection using the selected intersection control information piece.

4. The intersection control system according to claim 1, wherein the predetermined bit length is set according to the number of combinations of an entry road to the intersection and an exit road from the intersection.

5. The intersection control system according to claim 1, wherein the intersection control unit is configured to transmit the at least one intersection control information piece to the vehicle attempting to enter the intersection.

6. An intersection control method for controlling entries of vehicles into an intersection, the intersection control method comprising:

acquiring a plurality of types of intersection environment information;

encoding the intersection environment information into a predetermined bit length for each type of the intersection environment information;

generating at least one intersection control information piece by integrating the plurality of types of intersection environment information through bit operations; and controlling the entries of the vehicles into the intersection using the at least one intersection control information piece.

7. A non-transitory computer readable medium storing a program, the program causing a computer to execute the intersection control method according to claim 6.

* * * * *